(12) United States Patent
Ono et al.

(10) Patent No.: US 7,842,370 B2
(45) Date of Patent: Nov. 30, 2010

(54) CORDIERITE CERAMIC AND METHOD FOR MANUFACTURING THE SAME

(75) Inventors: Yohei Ono, Kiyosu (JP); Satoshi Yamazaki, Nagoya (JP); Yuji Katsuda, Tsushima (JP); Shuji Ueda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 410 days.

(21) Appl. No.: 11/945,450

(22) Filed: Nov. 27, 2007

(65) Prior Publication Data

US 2008/0124515 A1    May 29, 2008

(30) Foreign Application Priority Data

Nov. 28, 2006 (JP) ............................. 2006-320646
Nov. 12, 2007 (JP) ............................. 2007-293476

(51) Int. Cl.
*B32B 3/12* (2006.01)
*C04B 35/00* (2006.01)

(52) U.S. Cl. ................. 428/116; 428/697; 428/701; 428/702; 501/103; 501/134

(58) Field of Classification Search ................. None
See application file for complete search history.

(56) References Cited

U.S. PATENT DOCUMENTS 4,758,542 A * 7/1988 Parker ................. 501/134

FOREIGN PATENT DOCUMENTS

JP           06-172016 A1        6/1994

* cited by examiner

*Primary Examiner*—Ling Xu
(74) *Attorney, Agent, or Firm*—Burr & Brown

(57) ABSTRACT

A cordierite ceramic is provided, which includes at least zirconium oxide or hafnium oxide, and also includes titanium oxide. The molar ratio of zirconium (Zr), hafnium (Hf) and titanium (Ti) in terms of the moles in the form of the dioxides, respectively which is given by the formula $[(ZrO_2+HfO_2)/TiO_2]$ is in a range of 0.1 to 5. In this cordierite ceramic, the phases of the components are contained mainly as zirconium titanate or hafnium titanate, and no heterogeneity in appearance, caused by change in color and generation of spots occurs. A honeycomb structure made of the cordierite ceramic is also provided.

6 Claims, 5 Drawing Sheets

CORDIERITE CERAMIC AND METHOD FOR MANUFACTURING THE SAME

BACKGROUND OF THE INVENTION AND RELATED ART STATEMENT

The present invention relates to a cordierite ceramic and a method for manufacturing the cordierite ceramic.

Cordierite ceramic shows high heat resistance, low thermal expansion and high thermal shock resistance and therefore is in wide use as, for example, a catalyst carrier or a filter for purification of exhaust gases emitted from internal combustion engines of automobiles and the like. In industrial production of this cordierite ceramic, there are often used natural raw materials such as kaolin, talc, aluminum-containing oxides, hydrates and the like. However, these raw materials contain impurities such as titanium oxide, iron oxide, alkali or alkaline earth metal oxide and the like. Being natural raw materials, they differ in the amounts of components contained, depending upon, for example, the place of origin, the place of mining, the timing of mining.

It is known that ceramics, when containing impurities, cause color change in the resulting products (for example, see JP-A-6-172016).

Cordierite ceramic as well shows, in some cases, color change depending upon the compositional fluctuation of raw materials, mainly the above-mentioned impurity components. In particular, depending upon the amounts and proportions of titanium oxide, iron oxide, and the like contained in raw materials, cordierite ceramic changes its color from light yellow to reddish brown. Further, there is a case of coloring in spots, which gives heterogeneous appearance.

SUMMARY OF THE INVENTION

The object of the present invention is to provide a cordierite ceramic which gives no heterogeneous appearance caused by color change, spots generation, and the like; and a method for manufacturing the cordierite ceramic.

In order to achieve the above object, the present inventors analyzed the cause of coloring and made a keen examination. As a result, it was found that the condition, amount and proportion of iron oxide-titanium oxide greatly affect the color development in cordierite ceramic. In particular, the titanium oxide component containing dissolved iron oxide gives rise to reddish brown color and is considered to easily generate spots. Hence, a study was made on a method for prevention of spots generation. As a result, it was found that addition of zirconium component or hafnium component could prevent or reduce the formation of titanium oxide which is considered to be a main component of spots and could prevent spots generation. Hence, in order to achieve the above object, the present invention provides a cordierite ceramic and a method for manufacturing the cordierite ceramic described below.

According to a first aspect of the present invention, a cordierite ceramic is provided, which includes at least either of zirconium oxide and hafnium oxide and also includes titanium oxide, wherein the molar ratio of zirconium (Zr), hafnium (Hf) and titanium (Ti) in terms of the moles in the form of the dioxides, respectively which is given by the formula $[(ZrO_2+HfO_2)/TiO_2]$ is in a range of 0.1 to 5.

According to a second aspect of the present invention, the cordierite ceramic according to the first aspect is provided, wherein the total content of the zirconium oxide and the hafnium oxide is 0.01 to 10% by mass when zirconium and hafnium are expressed as zirconium dioxide ($ZrO_2$) and hafnium dioxide ($HfO_2$), respectively.

According to a third aspect of the present invention, the cordierite ceramic according to the first or second aspects is provided, wherein the zirconium oxide and the titanium oxide are contained as zirconium titanate, or the hafnium oxide and the titanium oxide are contained as hafnium titanate.

According to a fourth aspect of the present invention, the cordierite ceramic according to the third aspect is provided, wherein, in a peak profile measured by X-ray diffraction (CuKα ray), height strength of a peak attributed to $ZrTiO_4$ and/or $HfTiO_4$ observed at a diffraction angle $2\theta=30$ to $31°$ is higher than that of a peak attributed to $TiO_2$ observed at a diffraction angle $2\theta=27.2$ to $27.6°$.

According to a fifth aspect of the present invention, the cordierite ceramic according to any one of the first to fourth aspects is provided, which has a honeycomb structure.

According to a sixth aspect of the present invention, a method for manufacturing a cordierite ceramic is provided, wherein a content of Zr component and/or Hf component in terms of oxides ($ZrO_2$, $HfO_2$, mol) with respect to a content of Ti component contained as a impurity in terms of oxides ($TiO_2$, mol) in a raw material are/is adjusted in such a manner that a molar ratio of $(ZrO_2+HfO_2)/TiO_2$ is 0.1 to 5 when components constituting a cordierite raw material are considered to be metal oxides of each component in a step of manufacturing a cordierite ceramic.

According to a seventh aspect of the present invention, the method for manufacturing a cordierite ceramic according to the sixth aspect is provided, wherein an amount of addition of Zr component or Hf component contained in the cordierite raw material in terms of oxides is 0.01 to 10% by mass with respect to an amount of metal oxide components of the cordierite raw material.

According to an eighth aspect of the present invention, the method for manufacturing a cordierite ceramic according to the sixth or seventh aspects is provided, wherein each of the components to be added to the cordierite raw material has an average particle diameter of 5 μm or less.

In the cordierite ceramic of the present invention containing a zirconium component or a hafnium component, the titanium oxide component contained therein is trapped mainly as zirconium titanate or hafnium titanate; formation of a titanium oxide component containing dissolved iron oxide is prevented or suppressed; generation of spots is prevented; thereby, heterogeneity in appearance is prevented. Further, the thermal expansion coefficient of zirconium titanate or hafnium titanate is small as compared to that of titanium oxide. The thermal expansion coefficient of titanium oxide, for example, at 20 to 500° C. is about 8.3 ppm/° C. while that of zirconium titanate is about 7.5 ppm/° C. and that of hafnium titanate is about 4.1 ppm/° C. Thus, by preventing formation of titanium oxide and forming zirconium titanate or hafnium titanate, there can be obtained a cordierite ceramic of reduced thermal expansion coefficient.

REFERENCE NUMERALS

1: honeycomb structure, 2: cell

DETAILED DESCRIPTION OF THE INVENTION

Embodiments of the present invention are described below referring to the accompanied drawings. The present invention is not restricted to the following embodiments, and changes, modifications and improvements can be made as long as there is no deviation from the scope of the present invention.

The cordierite ceramic, which is an embodiment of the present invention, contains at least either of zirconium oxide and hafnium oxide, and also contains titanium oxide. Specifically explaining, zirconium (Zr), hafnium (Hf) and titanium (Ti) are preferred to be contained, in terms of the moles in the form of the dioxides, at a molar ratio given by the formula: $[(ZrO_2+HfO_2)/TiO_2]$ of 0.1 to 5. Further, the total content of zirconium oxide and hafnium oxide is preferred to be 0.01 to 10% by mass when zirconium and hafnium are expressed as zirconium dioxide ($ZrO_2$) and hafnium dioxide ($HfO_2$), respectively. In the cordierite ceramic of such an embodiment, there is mainly contained zirconium titanate ($ZrTiO_4$) or hafnium titanate ($HfTiO_4$). In a cordierite ceramic of the present invention, in a peak profile measured by X-ray diffraction (CuKα ray), height strength of a peak attributed to $ZrTiO_4$ and/or $HfTiO_4$ observed at a diffraction angle $2\theta=30$ to $31°$ is higher than that of a peak attributed to $TiO_2$ observed at a diffraction angle $2\theta=27.2$ to $27.6°$. That is, $TiO_2$, which causes spots, reduces. The cordierite ceramic referred to herein is desired to contain few impurities. Generally, however, impurity phases are often contained in an amount of several percent by mass. Therefore, the cordierite ceramic referred to herein contains cordierite as a main phase in an amount of 90% by mass or more. Here, conversion of Zr amount, Hf amount and Ti amount into $ZrO_2$ amount, $HfO_2$ amount and $TiO_2$ amount is done by calculating $ZrO_2$ mass, $HfO_2$ mass and $TiO_2$ mass from chemically determined Zr amount, Hf amount and Ti amount in a cordierite ceramic. Incidentally, in Examples and Comparative Examples, the Zr amount, Hf amount and Ti amount were expressed as "converted $ZrO_2$ content (unit: % by mass)", "converted $HfO_2$ content (unit: % by mass)" and "converted $TiO_2$ content (unit: % by mass)".

Figure 1:
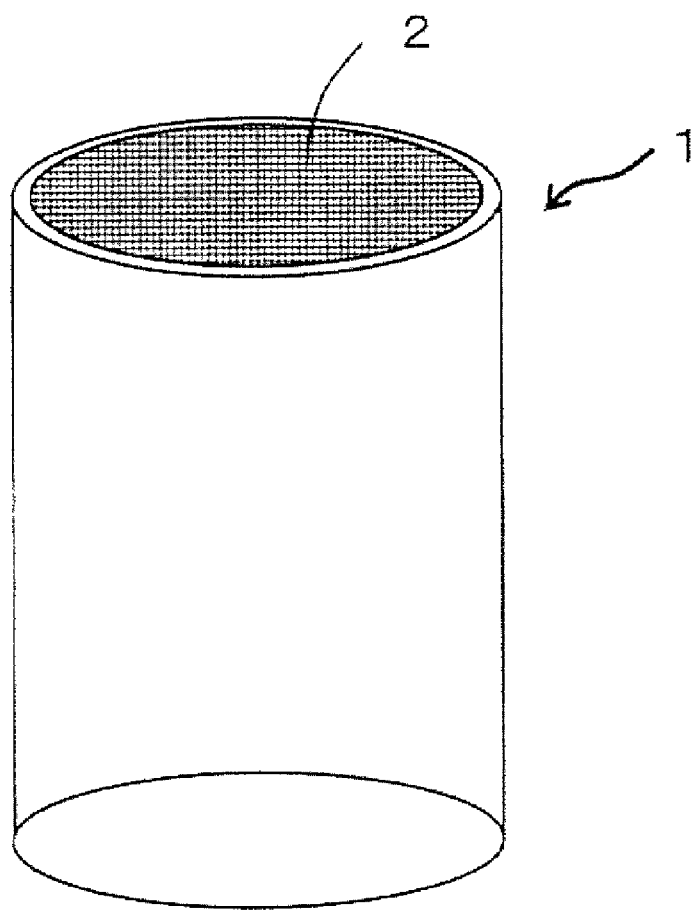
FIG. 1 is a honeycomb structure formed with the cordierite ceramic of the present invention.

As an embodiment of the honeycomb structure of the present invention, there can be mentioned a honeycomb structure 1 shown in FIG. 1, formed by the above-mentioned cordierite ceramic. However, the total shape, cell shape, and the like of the honeycomb structure of the present invention are not restricted to those shown in FIG. 1. As to the total shape, there can be mentioned shapes such as a square prism or a triangular prism other than a cylinder shown in FIG. 1. The cell shape (the shape of cell 2 in a section perpendicular to the flow direction of fluid) can be shapes such as a hexagon, a triangle, or a circle other than a square shown in FIG. 1. Incidentally, the honeycomb structure 1 of the present embodiment can be used, for example, as a catalyst carrier wherein a catalyst is to be loaded on the surface of the porous partition walls or in the pores of the partition walls. The honeycomb structure 1 can also be used as a filter by plugging a plurality of the cell openings of each end face alternately in such a way that each cell is plugged at either of the two openings.

When the honeycomb structure 1 of the present embodiment is used as a catalyst carrier, the cell density may ordinarily be 6 to 1,500 cells/in$^2$ (0.9 to 233 cells/cm$^2$) and the partition wall thickness may ordinarily be 50 to 2,000 μm. The length in the flow direction of fluid (the total length of the honeycomb structure) is ordinarily 60 to 300 mm, preferably 100 to 250 mm.

In the above cordierite ceramic, since a zirconium component or a hafnium component is added, the titanium oxide component is trapped mainly as zirconium titanate or hafnium titanate; formation of a titanium oxide component containing dissolved iron oxide is prevented or suppressed; generation of reddish brown color and spots is prevented; as a result, heterogeneity in appearance is prevented. Also in the honeycomb structure 1 constituted by such a cordierite ceramic, generation of reddish brown color and spots is prevented and heterogeneity in appearance is prevented. The thermal expansion coefficient of zirconium titanate or hafnium titanate is small as compared to that of titanium oxide; therefore, by preventing formation of titanium oxide and forming zirconium titanate or hafnium titanate, there can be obtained a cordierite ceramic of reduced thermal expansion coefficient.

Next, description is made on the processes for producing the cordierite ceramic and a honeycomb structure 1, of the present invention. First, there are mixed kaolin, talc, alumina, a silica powder, and the like to obtain a raw material for cordierite formation. In production of the cordierite ceramic of the present invention (embodiments shown in Examples), there is used a raw material further containing a zirconium-containing component or a hafnium-containing component. Incidentally, the raw material for cordierite formation may be, besides (magnesium oxide+aluminum oxide+silicon oxide), any raw material which, upon firing, can form an oxide(s) comprising such components. For example, there can be used, besides the above-mentioned kaolin ($Al_2O_3 \cdot 2SiO_2 \cdot 2H_2O$), talc ($3MgO \cdot 4SiO_2 \cdot H_2O$) and alumina, magnesite ($MgCO_3$), mullite ($3Al_2O_3 \cdot 2SiO_2$), silicon oxide ($SiO_2$) such as quartz, aluminum hydroxide, active alumina, boehmite, and the like.

As the zirconium-containing component, there can be used zirconium oxide, an oxide containing a zirconium oxide component, zirconium silicate, or a substance which can be converted, upon firing, into a zirconium oxide-containing component. As the hafnium-containing component, there can be used hafnium oxide, an oxide containing a hafnium oxide component, or a substance which can be converted, upon firing, into a hafnium oxide-containing component. Each of the components to be added preferably has an average particle diameter of 5 μm or less, and more preferably 3 μm or less for higher dispersion.

More specifically, a content of Zr component and/or Hf component in terms of oxides ($ZrO_2$, $HfO_2$, mol) with respect to a content of Ti component contained as a impurity in terms of oxides ($TiO_2$, mol) in a raw material are/is adjusted in such a manner that a molar ratio of $(ZrO_2+HfO_2)/TiO_2$ is desirably 0.1 to 5, more desirably 0.1 to 2, when components constituting a cordierite raw material are considered to be metal oxides of each component in a step of manufacturing a cordierite ceramic. In addition, an amount of addition of Zr component and/or Hf component contained in the cordierite raw material in terms of oxides is desirably 0.01 to 10% by mass, more desirably 0.1 to 5% by mass, with respect to an amount of metal oxide components of the cordierite raw material. When too much Zr component and/or Hf component are/is contained, a deviation from a cordierite composition is caused.

As the dispersing medium to be added, there can be mentioned water, a mixed solvent of water and an organic solvent such as alcohol, and the like. In particular, water can be used suitably. In mixing and kneading the raw material for cordierite formation with the dispersing medium, there may be further added additives such as organic binder, dispersing agent and the like. The mixing and kneading can be conducted using a known technique.

The clay prepared is subjected to forming by a method such as extrusion, whereby can be obtained a honeycomb formed body comprising partition walls which form a plurality of cells. Then the honeycomb formed body is dried to obtain a dried honeycomb body. The drying can as well be conducted using heretofore known drying methods. Among them, a combination of hot-air drying and microwave drying or dielectric drying is preferred because it enables rapid and uniform drying.

The resultant dried honeycomb body is fired to obtain a cordierite honeycomb structure. The firing conditions (temperature and time) employed differ depending upon the kinds of individual raw material particles constituting the honeycomb formed body and, therefore, can be set appropriately depending upon these kinds. For example, the firing is generally conducted at a temperature of 1,400 to 1,440° C. for 3 to 10 hours. When the firing conditions (temperature and time) are below the above ranges, formation of cordierite tends to be insufficient. Meanwhile, when the firing conditions exceed the above ranges, the cordierite formed tends to melt.

In the above-produced cordierite ceramic which contains at least either of zirconium oxide and hafnium oxide and also contains titanium oxide and wherein the molar ratio of zirconium (Zr), hafnium (Hf) and titanium (Ti), in terms of the moles in the form of the dioxides, respectively, which is given by the formula $[(ZrO_2+HfO_2)/TiO_2]$ is in a range of 0.1 to 5, desirably 0.1 to 2, as well as in the honeycomb structure formed with the cordierite ceramic, generation of reddish brown color and spots is prevented and heterogeneity in appearance is prevented.

EXAMPLES

The present invention is described in more detail below by way of Examples. However, the present invention is in no way restricted to these Examples.

As raw materials for formation of cordierite, there were used a natural kaolin powder ($TiO_2$ content: 1.4 to 2.3% by mass), a natural talc powder ($Fe_2O_3$ content: 1.9% by mass), an alumina powder (purity: 99% by mass or more) and a silica powder (purity: 99.5% by mass or more). They were weighed so as to give, after firing, a cordierite composition of $2MgO.2Al_2O_3.5SiO_2$. However in weighing, no consideration was made on the impurity content in each raw material. To these raw material powders was added a dispersing medium, followed by mixing and kneading using the above-mentioned technique, to obtain cylindrically formed clay. Then, this clay was fed into an extruder and formed into a honeycomb formed body. The resultant honeycomb formed body was dried and then fired at 1,440° C. for 5 hours, to obtain a cylindrical cordierite honeycomb. The dimension of the honeycomb was approximately 70 mm (diameter)×100 mm (total length); the partition wall thickness was 200 to 250 μm; and the cell density was 400 cells/in².

Comparative Example 1

Figure 3:
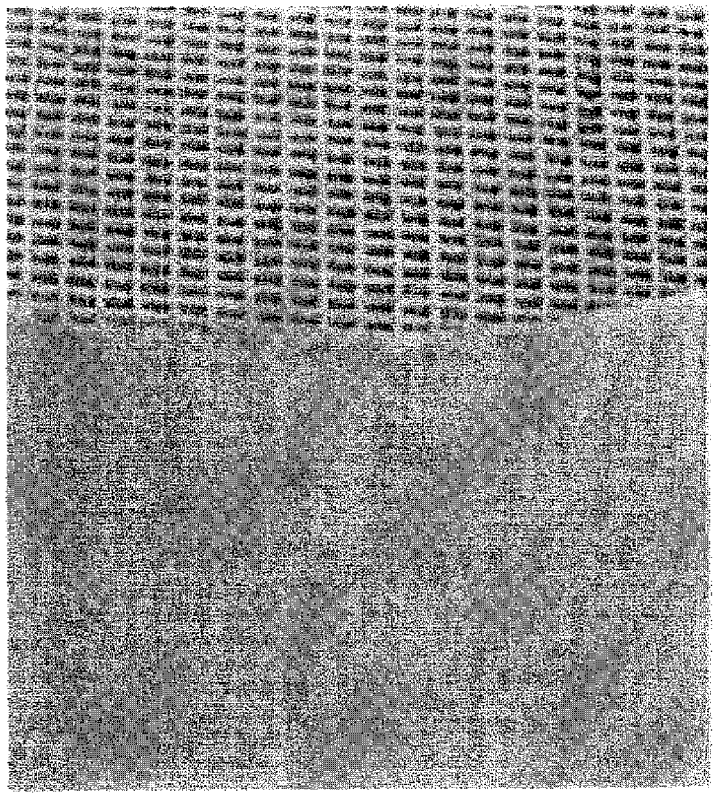
FIG. 3 is an overview photograph of the honeycomb structure of Comparative Example 1.

FIG. 3 is an overview photograph of the cordierite honeycomb produced by the above method. In the cordierite honeycomb were seen many red spots (black in the photograph) which could be confirmed visually. The spots were approximately 0.5 to 2 mm in size and were 10 or more per cm². This material was subjected to chemical analysis using a fluorescent X-ray spectrometer, in which converted $TiO_2$ content was 0.77% by mass and converted $ZrO_2$ content and converted $HfO_2$ content were both below the detection limit (0.01% by mass or less). The molar ratio of converted $ZrO_2$, converted $HfO_2$ and converted $TiO_2$ given by the formula $[(ZrO_2+HfO_2)/TiO_2]$ was 0.01 or less. Incidentally, Table 1 shows the $TiO_2$ content in the raw material.

Example 1

Figure 2:
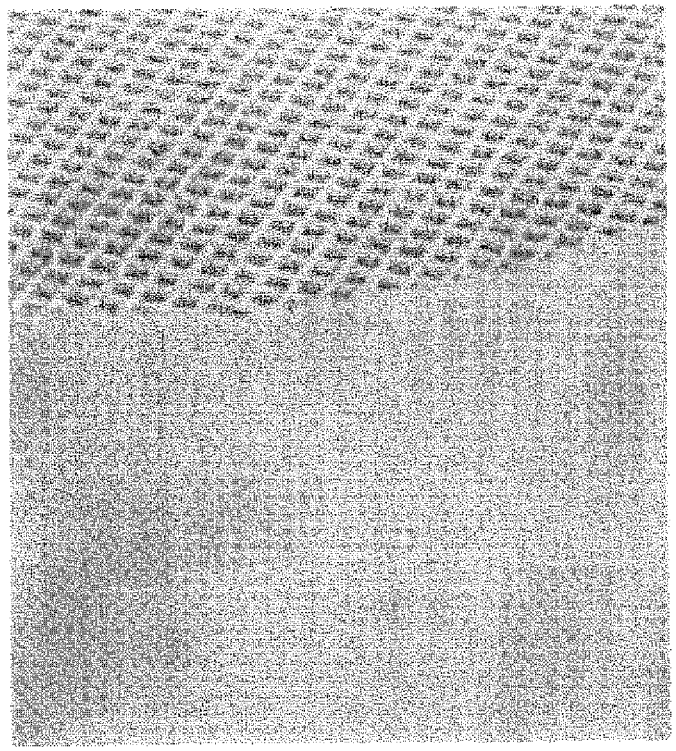
FIG. 2 is an overview photograph of the honeycomb structure of Example 1.

To 100% of the cordierite composition (no consideration was made on the impurity content) of Comparative Example 1 was added 0.3% by mass (relative to the cordierite composition) of a $ZrO_2$ powder (purity: 99.9% by mass, average particle diameter: 1 μm). In the same manner as in Comparative Example 1 was produced a cordierite honeycomb. FIG. 2 is an overview photograph of the resultant honeycomb. In the material of Example 1, there was no red spots seen in Comparative Example 1 and the appearance showed a homogeneous color. A chemical analysis indicated that converted $TiO_2$ content of the sintered body was 0.76% by mass, converted $ZrO_2$ content was 0.27% by mass, converted $HfO_2$ content was below the detection limit (0.01% by mass or less), and the molar ratio of $ZrO_2/TiO_2$ was 0.23. Incidentally, Table 1 shows the $TiO_2$ content in the raw material and the $(ZrO_2+HfO_2)/TiO_2$ molar ratio.

(Evaluation)

Figure 4:
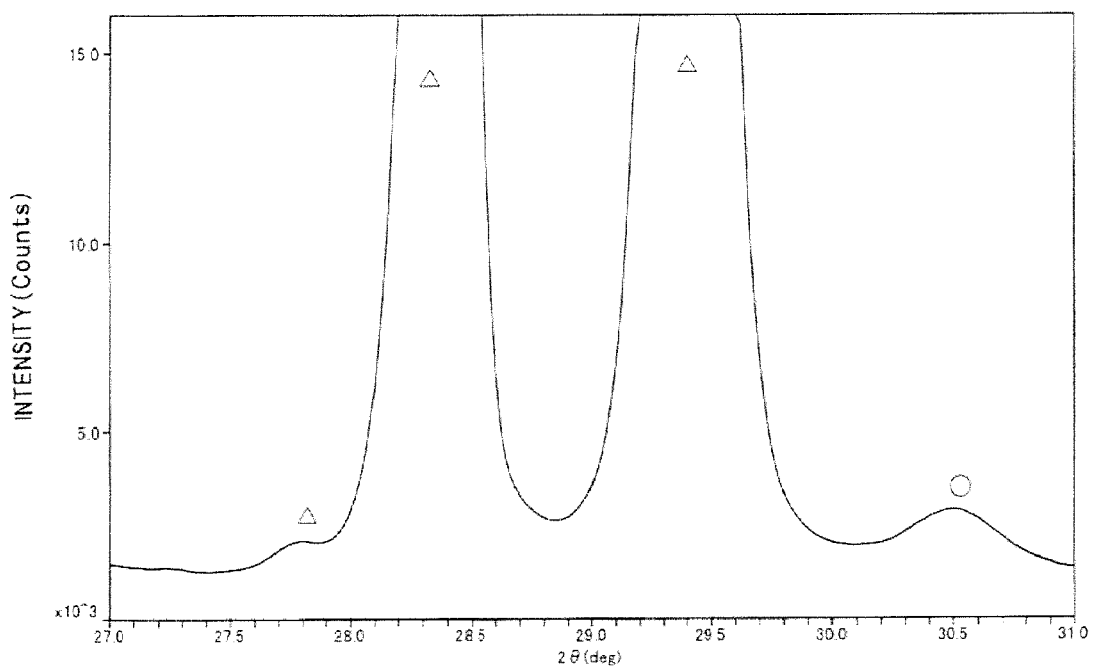
FIG. 4 shows the XRD chart of Example 1.
Figure 5:
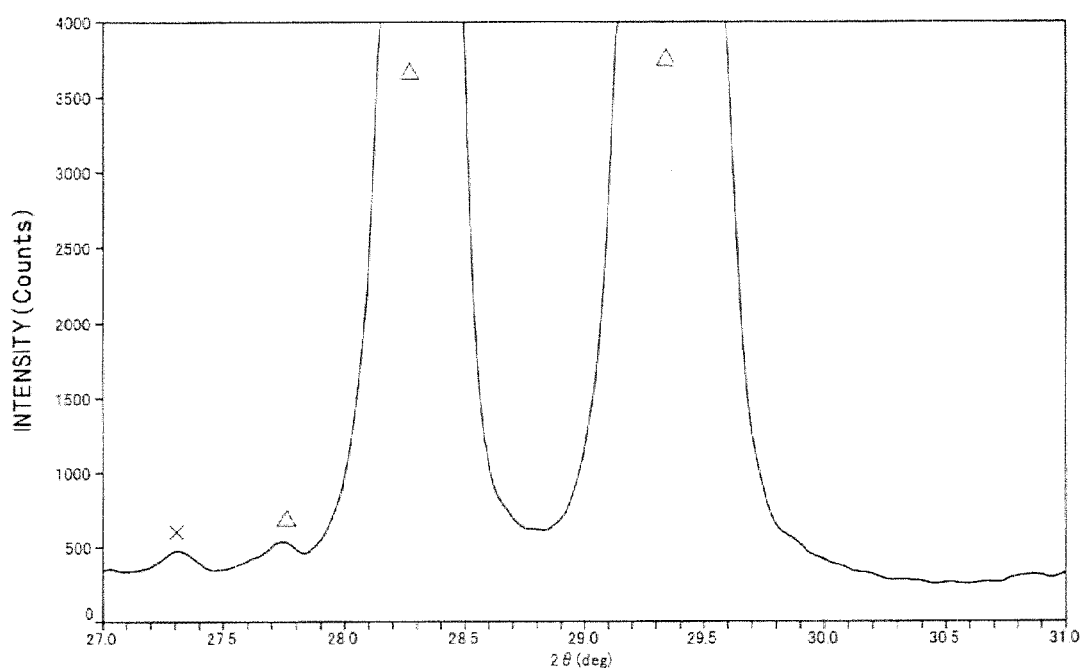
FIG. 5 shows the XRD chart of Comparative Example 1.

Part of the cordierite honeycombs produced in Comparative Example 1 and Example 1 was ground and measured for crystalline phases contained in each material, using a rotating-anode X-ray diffractometer manufactured by K.K. Rigaku Denki (measurement conditions: $CuK_\alpha$ ray, 50 kV, 300 mA, 2θ=5 to 70°). As a result, in both honeycombs, the main phase was confirmed to be cordierite. The peak profiles (2θ=27 to 31°) of impurity phases components are shown in FIGS. 4 and 5. In these figures, ○ is a peak belonging to $ZrTiO_4$, Δ is a peak belonging to cordierite, and X is a peak belonging to $TiO_2$.

In the material of Comparative Example 1 (FIG. 5), the peak belonging to $TiO_2$ was seen clearly. In contrast, in the material of Example 1 (FIG. 4), substantially no peak of $TiO_2$ was seen and, instead, formation of $ZrTiO_4$ was recognized. That is, in the material of Example 1, the formation of $TiO_2$, which is considered to be a main cause of red spots, is prevented by addition of $ZrO_2$, and $TiO_2$ is trapped in the form of $ZrTiO_4$.

Similarly, cordierite honeycombs of Examples 2 to 13 and Comparative Example 2 were produced and examined for properties. The results are shown in Table 1.

TABLE 1

| | Raw material | | | | Fired body | | | | | | |
|---|---|---|---|---|---|---|---|---|---|---|---|
| | $TiO_2$ content % by mass | $ZrO_2$ additive amount % by mass | $HfO_2$ additive amount % by mass | $(ZrO_2/HfO_2)/TiO_2$ Molar ratio | Converted $TiO_2$ content % by mass | Converted $ZrO_2$ content % by mass | Converted $HfO_2$ content % by mass | $ZrO_2/TiO_2$ molar ratio | $HfO_2/TiO_2$ molar ratio | $(ZrO_2/HfO_2)/TiO_2$ Molar ratio | Red spots |
| Example 1 | 0.75 | 0.3 | 0 | 0.26 | 0.76 | 0.27 | <0.01 | 0.23 | <0.01 | 0.23 | Not present |
| Example 2 | 0.75 | 0.14 | 0 | 0.12 | 0.72 | 0.13 | <0.01 | 0.12 | <0.01 | 0.12 | Not present |
| Example 3 | 0.74 | 0.15 | 0 | 0.13 | 0.72 | 0.15 | <0.01 | 0.14 | <0.01 | 0.14 | Not present |
| Example 4 | 0.75 | 0.6 | 0 | 0.52 | 0.72 | 0.52 | <0.01 | 0.47 | <0.01 | 0.47 | Not present |
| Example 5 | 0.60 | 0.1 | 0 | 0.11 | 0.58 | 0.10 | <0.01 | 0.11 | <0.01 | 0.11 | Not present |
| Example 6 | 0.85 | 1.5 | 0 | 1.14 | 0.85 | 1.47 | <0.01 | 1.12 | <0.01 | 1.12 | Not present |
| Example 7 | 0.80 | 2.3 | 0 | 1.86 | 0.77 | 2.20 | <0.01 | 1.85 | <0.01 | 1.85 | Not present |
| Example 8 | 0.90 | 0.2 | 0 | 0.14 | 0.88 | 0.20 | <0.01 | 0.15 | <0.01 | 0.15 | Not present |

TABLE 1-continued

| | Raw material | | | | Fired body | | | | | | |
|---|---|---|---|---|---|---|---|---|---|---|---|
| | $TiO_2$ content % by mass | $ZrO_2$ additive amount % by mass | $HfO_2$ additive amount % by mass | $(ZrO_2/ HfO_2)/ TiO_2$ Molar ratio | Converted $TiO_2$ content % by mass | Converted $ZrO_2$ content % by mass | Converted $HfO_2$ content % by mass | $ZrO_2/TiO_2$ molar ratio | $HfO_2/TiO_2$ molar ratio | $(ZrO_2/ HfO_2)/ TiO_2$ Molar ratio | Red spots |
| Example 9 | 0.88 | 1.0 | 0 | 0.74 | 0.88 | 0.97 | <0.01 | 0.71 | <0.01 | 0.71 | Not present |
| Example 10 | 0.85 | 0.7 | 0 | 0.53 | 0.85 | 0.67 | <0.01 | 0.51 | <0.01 | 0.51 | Not present |
| Example 11 | 0.85 | 0 | 1.0 | 0.45 | 0.77 | <0.01 | 0.92 | <0.01 | 0.45 | 0.45 | Not present |
| Example 12 | 0.85 | 0 | 1.5 | 0.67 | 0.81 | <0.01 | 1.45 | <0.01 | 0.68 | 0.68 | Not present |
| Example 13 | 0.58 | 3.6 | 0 | 4.02 | 0.57 | 3.58 | <0.01 | 4.07 | <0.01 | 4.07 | Not present |
| Comp. Ex. 1 | 0.80 | 0 | 0 | 0.00 | 0.77 | <0.01 | <0.01 | <0.01 | <0.01 | <0.01 | Present |
| Comp. Ex. 2 | 0.72 | 0.08 | 0 | 0.07 | 0.71 | 0.07 | <0.01 | 0.07 | <0.01 | 0.07 | Present |

Comparative Example 2 and Example 2

In Comparative Example 2 and Example 2, cordierite honeycombs were produced in the same manner as in Example 1 and were examined for color, contents of components and crystalline phases. Comparative Example 2 is a case in which the converted $ZrO_2$ content was small as compared with the converted $TiO_2$ content; light red spots were still seen though color was improved in comparison with Comparative Example 1; the $ZrO_2/TiO_2$ molar ratio of the sintered body was 0.07; in X-ray diffractiometry, a $TiO_2$ peak was seen but almost no $ZrTiO_4$ peak was seen. In contrast, Example 2 is a case in which the converted $ZrO_2$ content was large; color was improved; the molar ratio was 0.12; in X-ray diffractiometry, a $TiO_2$ peak was seen very slightly and formation of $ZrTiO_4$ was confirmed. That is, in the material of Example 2, the formation of $TiO_2$, which is considered to be a main cause of red spots, was prevented by addition of $ZrO_2$ and the $TiO_2$ component was mostly trapped in the form of $ZrTiO_4$.

Examples 3 to 13

In Examples 3 to 13, cordierite honeycombs were produced in the same manner as in Example 1 and were examined for color, contents of components and crystalline phases. Example 10 is a case in which $ZrSiO_4$ (zirconium silicate, purity: 99% by mass or more, average particle diameter: 5 μm) was added in place of $ZrO_2$ of Example 1; and Examples 11 and 12 are cases in which $HfO_2$ (purity: 99.9% by mass or more, average particle diameter: 3 μm) was added in place of $ZrO_2$ of Example 1. In each of the materials of Examples 3 to 9 in which $ZrO_2$ was added, the same effects as in Example 1 were seen. That is, there was improvement in color; formation of $TiO_2$ was prevented or suppressed; and there was formation of $ZrTiO_4$. In X-ray diffractiometry, as $ZrO_2/TiO_2$ molar ratio became larger than that of Comparative Example 2, $TiO_2$ peak became smaller or disappeared and there were seen formation or growth of $ZrTiO_4$ peak. That is, the $TiO_2$ component, which is considered to be a main cause of red spots, was trapped in the form of $ZrTiO_4$. In the material of Example 10 in which $ZrSiO_4$ was added, the $ZrO_2/TiO_2$ molar ratio of the sintered body was 0.51, and there was seen, as in Example 1, prevention of $TiO_2$ formation and formation of $ZrTiO_4$. In Examples 11 and 12, the molar ratio of $HfO_2/TiO_2$ of the sintered body was 0.45 and 0.68, respectively, and, as in Example 1, there was seen prevention of red spots. In X-ray diffractiometry, there were seen no formation of $TiO_2$ peak but formation of $HfTiO_4$ peak, and the same effects as in $ZrO_2$-added materials were obtained. When there was an increase in converted $TiO_2$ content in cordierite, color improvement was obtained by controlling the converted $ZrO_2$ content or converted $HfO_2$ content in the material composition to be increased. On the other hand, when the $ZrO_2/TiO_2$ molar ratio was large, the $ZrO_2$ content which did not react with $TiO_2$ increased, and this surplus $ZrO_2$ reacted with $SiO_2$ and the like of raw material components of cordierite to form a $ZrSiO_4$ and the like, which causes a deviation from a cordierite composition. Therefore, a desirable $ZrO_2/TiO_2$ molar ratio was found to be 0.1 to 5, more desirably 0.1 to 2.

INDUSTRIAL APPLICABILITY

The present invention can be used suitably as a honeycomb structure used, for example, as a filter or a catalyst carrier for purification of exhaust gases emitted from internal combustion engines of automobiles, and the like.

What is claimed is:

1. A cordierite ceramic comprising at least zirconium oxide or hafnium oxide, and also including titanium oxide, wherein a molar ratio of zirconium (Zr), hafnium (Hf) and titanium (Ti) in terms of moles in the form of dioxides, respectively, which is given by the formula $[(ZrO_2+HfO_2)/TiO_2]$, is in a range of 0.1 to 5;
   wherein a total content of the zirconium oxide and the hafnium oxide is 0.01 to 10% by mass when zirconium and hafnium are expressed as zirconium dioxide ($ZrO_2$) and hafnium dioxide ($HfO_2$), respectively; and
   wherein the zirconium oxide and the titanium oxide are contained as zirconium titanate, or the hafnium oxide and the titanium oxide are contained as hafnium titanate.

2. A cordierite ceramic according to claim 1, wherein, in a peak profile measured by X-ray diffraction (CuKα ray), height strength of a peak attributed to $ZrTiO_4$ or $HfTiO_4$ observed at a diffraction angle 2θ=30 to 31° is higher than that of a peak attributed to $TiO_2$ observed at a diffraction angle 2θ=27.2 to 27.6°.

3. A cordierite ceramic according to claim 1, which has a honeycomb structure.

4. A cordierite ceramic according to claim 2, which has a honeycomb structure.

5. A method for manufacturing a cordierite ceramic, wherein a content of a Zr component or an Hf component, in terms of oxides ($ZrO_2$, $HfO_2$, mol), with respect to a content of a Ti component contained as a impurity, in terms of oxides ($TiO_2$, mol), in a raw material are adjusted in such a manner that a molar ratio of ($ZrO_2$+$HfO_2$)/$TiO_2$ is 0.1 to 5 when components constituting a cordierite raw material are considered to be metal oxides of each component in a step of manufacturing a cordierite ceramic;

wherein an added amount of the Zr component or the Hf component contained in the cordierite raw material, in terms of oxides, is 0.01 to 10 mass % with respect to an amount of the metal oxide components of the cordierite raw material; and wherein the zirconium oxide and the titanium oxide in the cordierite ceramic are contained as zirconium titanate, or the hafnium oxide and the titanium oxide are contained as hafnium titanate.

6. A method for manufacturing a cordierite ceramic according to claim 5, wherein each of the components added to the cordierite raw material has an average particle diameter of 5 μm or less.

* * * * *